United States Patent [19]

Rosset

[11] Patent Number: 4,593,982

[45] Date of Patent: Jun. 10, 1986

[54] DEVICE FOR TAKING PANORAMIC PHOTOGRAPHS WITH ORDINARY CAMERAS

[75] Inventor: Ivo Rosset, Pordenone, Italy

[73] Assignee: I.C.C. -Integrated Camera Complements s.r.l., Pordenone, Italy

[21] Appl. No.: 665,433

[22] Filed: Oct. 26, 1984

[30] Foreign Application Priority Data

Oct. 26, 1983 [IT] Italy ............................ 45730 A/83

[51] Int. Cl.[4] ............................................ G03B 37/02
[52] U.S. Cl. ..................................................... 354/99
[58] Field of Search ................................... 354/94–96, 354/98, 99

[56] References Cited

U.S. PATENT DOCUMENTS

| | | | |
|---|---|---|---|
| 1,266,616 | 5/1918 | Odell | 354/99 |
| 3,374,721 | 3/1968 | Van Praag | 354/99 |
| 3,620,148 | 11/1971 | LaRocco et al. | 354/99 |
| 3,635,140 | 1/1972 | Wolf | 354/99 |

FOREIGN PATENT DOCUMENTS 2317422 3/1974 Fed. Rep. of Germany ........ 354/99

Primary Examiner—Michael L. Gellner
Attorney, Agent, or Firm—Wenderoth, Lind & Ponack

[57] ABSTRACT

A rotating support (1) is placed on a fixed support (6) such as a traditional tripod, and an ordinary camera may be attached to the rotating support. This rotating support (1) is rotated with respect to the fixed support (6) by a geared motor (7) by means of a belt drive (72) with pulleys (52,71). A second geared motor (8), also by means of a belt drive (82) with pulleys (41,81) activates a connecting rotating element (44) which engages on the film rewind knob (45). A camera attachment piece with a window (9) is attached to the camera lens like an ordinary filter. This piece (9) consists of at least one opaque screen with a vertical slit (931), whose function is to reduce the width of the image, like the plate with a slit placed in front of the sensitive part of the film in panoramic cameras. Both geared motors (7 and 8) are provided with rotation rate detectors (73,83). An electronic device (90) monitors and regulates rotation rates and, in particular, causes controlled variation of the rotation rate of the geared motor (8) so that the film transfer rate will be constant.

12 Claims, 6 Drawing Figures

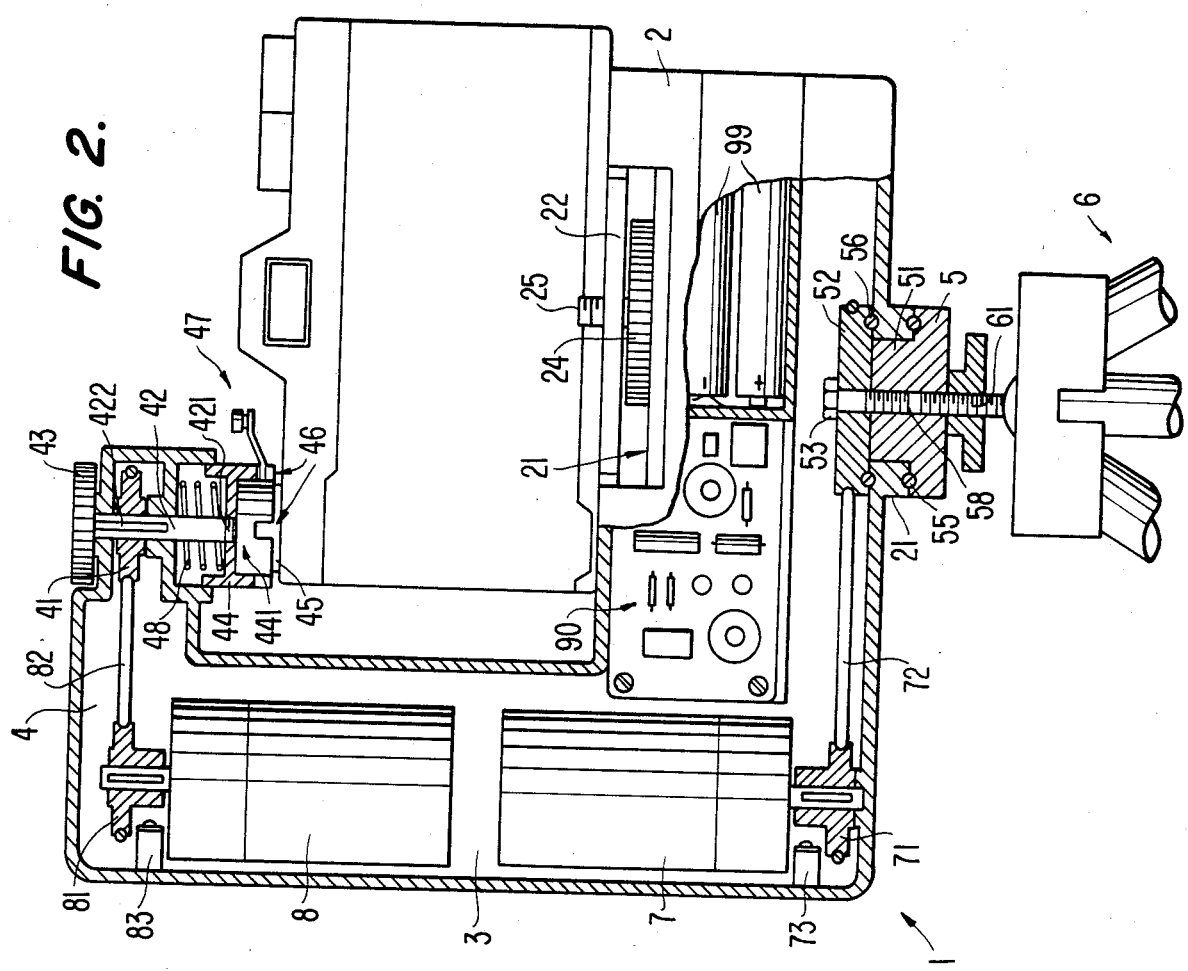
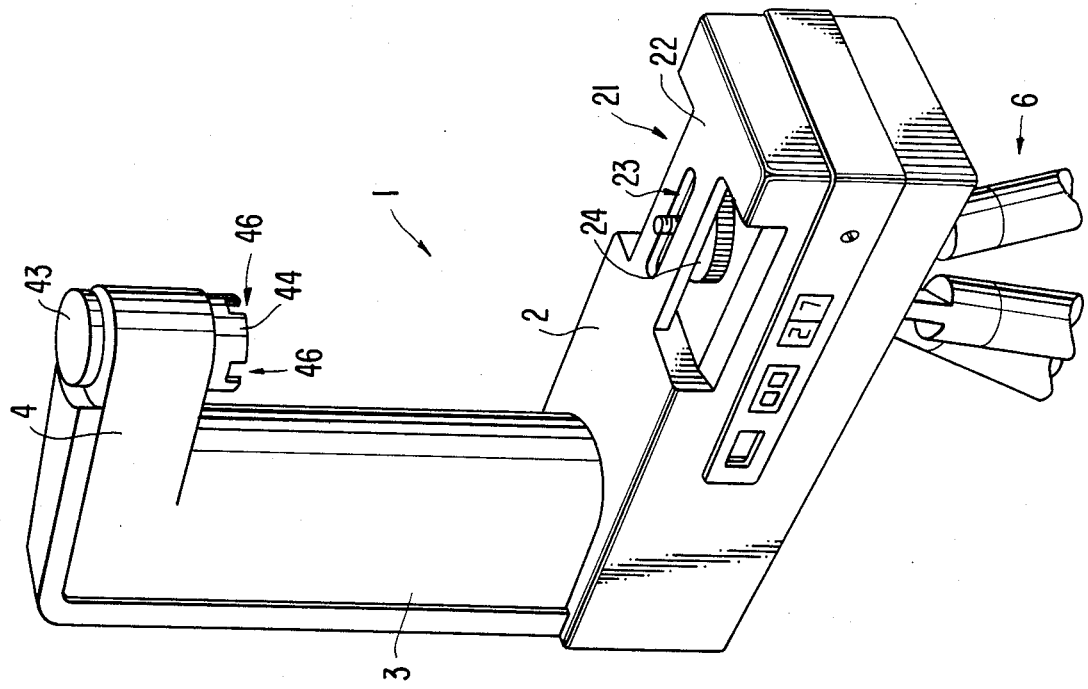

DEVICE FOR TAKING PANORAMIC PHOTOGRAPHS WITH ORDINARY CAMERAS

FIELD OF THE INVENTION

The object of this invention is a device which makes it possible to take panoramic photographs with an ordinary camera when the camera is attached to this device.

BACKGROUND OF THE INVENTION

It is known that, to obtain photographs covering a field even slightly larger than normal, special lenses such as wide-angle lenses are usually used. Fish-eye lenses are sometimes used to cover wider fields, but these cause considerable distortion of the image. However, they obtain photographs covering very extensive fields, up to 180° and even beyond, the so-called panoramic shots, using special cameras which are often very complicated and expensive. Furthermore, these cameras can be used only for the purpose for which they were constructed, and most are of the type described in Canadian Pat. No. 30143 of 1888. Other types of cameras provide various types of systems, all very complex.

A more convenient and particularly attractive solution is described in Pat. No. 1008 filed in Monaco on Aug. 29, 1972, which uses in practice the same principle as the Canadian patent cited above. However, it provides for the use of an ordinary camera attached to a rotating support in which a motor rotates the rotating support itself and at the same time, by means of an appropriate transmission, it also rotates the film rewind spool. As in the Canadian patent, the film's exposure surface is limited by a small vertical slit in a special plate which is inserted into the camera just in front of the sensitive surface of the film itself. However, this solution presents a number of disadvantages. First, the plate with a slit must be put into the camera, and this is impractical and inconvenient because each camera has its own internal structure, which means that an appropriate plate must be used for each type of camera. In addition, when the plate with a slit is put in place, the camera can be used only for panoramic shots. An additional disadvantage of this solution is that, while the shot is being made, the film transfer rate progressively increases because, while the rotation rate of the rewind spool is constant, the diameter of the rewound film increases progressively as the film accumulates on the spool, and this obviously causes substantial variations in the size of the image obtained which, particularly in shots covering very wide fields, are quite noticeable.

SUMMARY OF THE INVENTION

The purpose of this invention is to correct the limitations and disadvantages cited above. This purpose is achieved with the device described here, which is constructed fundamentally, in a known manner, of a rotating support to which an ordinary camera can be attached; this rotating support can be placed on a fixed support, such as a camera tripod or a similar support. This device is characterized by the fact that a piece with a window is attached to the camera lens like an ordinary filter, and this piece with a window can transversally demarcate the image. It includes first drive mechanisms that rotate the rotating support with respect to the fixed support and second drive mechanisms that operate the rotation of the camera's film rewind spool. These first and second drive mechanisms consist of two distinct geared motors. An electronic circuit capable fundamentally of monitoring and regulating the rates of the first and second drive mechanisms in order to keep the rate of the first strictly constant and to vary the rate of the second so that the film will move at a regular and uniform rate is also provided.

BRIEF DESCRIPTION OF THE DRAWINGS

The invention, in a preferred form of implementation, and only as a non-limiting example, will be described in more detail below with reference to the attached drawings, in which:

FIG. 1 shows a perspective view of the device described;

FIG. 2 shows the device in greater detail in cross-section;

In FIGS. 1–6, the common components are labeled with the same numerical references, and in FIG. 2 a generic camera placed on the device is indicated with a schematic line drawing.

DETAILED DESCRIPTION

Figure 3:
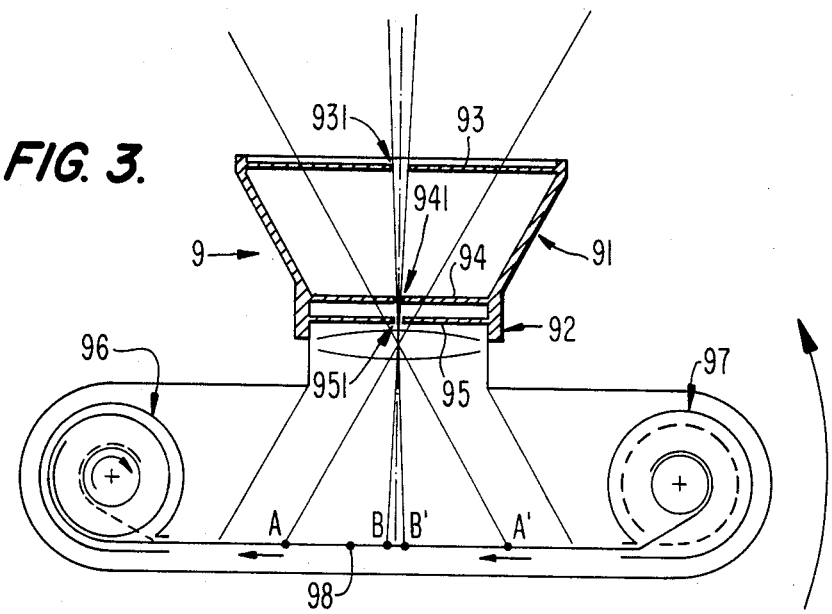
FIG. 3 shows schematically a generic camera with the film winding spools, and also shows a cross-section of the piece with a window which is attached, according to the invention, to the camera lens.

FIGS. 1 and 2 in particular show that the device in question is made up of a casing 1 formed in such a way that it constitutes a base part 2 which is substantially parallele-piped shaped, from one end of which a vertical part 3 branches off at a right angle and ends above it with a part referred to below as the "upper part" 4 projecting above the base part 2. A flange 5 projects from the lower part of the base part 2, and penetrates the lower wall with a cylindrical part 51 to which the pulley 52 is attached with a bolt 53. A first set of balls 55 is positioned between this flange 5 and the corresponding raised part 21 on the lower wall of the base part 2, and a second set of balls 56 is positioned between the pulley 52 and the corresponding lower wall of the base part 2, thus forming an actual ball bearing allowing free but precise rotation of the entire part 1 with respect to the flange 5. This flange 5 also has a central threaded hole 58 in which the screw 61 of a fixed support such as an ordinary tripod 6 may be engaged for attachment to the support. The pulley 52 is also connected, by means of the belt 72, to pulley 72 which is applied to the shaft of a first geared motor 7. The result is that when this geared motor 7 is rotated, the entire casing 1 and thus the device in question will rotate with respect to the fixed support 6.

On the upper portion of the base part 2, there is a recess 21, and in the upper portion of this recess 21, there is a plate 22 with a longitudinal opening 23. Between the bottom of this recess 21 and the plate 22 there is a fastening element consisting of a disk-shaped element 24. Branching off from the upper portion of this disk-shaped element is a screw 25 which passes through the longitudinal opening 23 and partially projects beyond the plate 22. This screw 25 can be engaged in the threaded hole normally found on all cameras to allow attachment to a tripod. The screw 25, and therefore the entire attachment element, can slide longitudinally in the longitudinal opening 23 so that the screw 25 can be positioned to correspond to the attachment hole of the camera to be attached to the device; as is known, the position of this hole varies from one camera to the next.

At the end of the upper part 4, there is a pulley 41 which hinges on a shaft 42, at the upper end of which is a control element 43, consisting substantially of a disk-shaped piece, and at the lower end of which is a detachable connection element 44, consisting fundamentally of a cylindrical piece with a hollow part 441 on its bottom end into which the film rewind knob 45, found on all ordinary cameras, can penetrate. On the circle in the lower part of this connection element 44 there are recesses 46 in which the rewind lever 47, which can be pulled out from the rewind knob 45, can be engaged. So that this device can be adapted to the various types of rewind knobs on the various cameras that are marketed, the connection element 44 can be of different sizes and shapes and is easily interchangeable, as it can be screwed onto and removed from the threaded end 421 of the shaft 42. Between the upper part 4 and the connection element 44, there is a spring 48 which can push it against the camera attached to the device. The pulley 41 will also be provided with a central square hole which can be engaged on a segment 422, also square, made in the shaft 42 in such a way that it can transmit its rotating movement to the shaft, and therefore this shaft 42 can be moved longitudinally into the hole.

It is clear that the operator, in order to attach the camera to the device described, must push up the control element 43 in order to raise the connection element 44 and allow the insertion of the camera. Once the camera is attached in this way to the base part 2 by means of the attachment element 24,25, in the manner described, the operator will release the control element 43, and the connection element 44 will be engaged against the rewind knob 45, which will penetrate into it with its lever 47, which will be positioned in one of the recesses 46. Finally, the pulley 41 will be connected by means of the belt 82 to the pulley 81 applied to the shaft of a second geared motor 8. The result is that when the geared motor 8 is rotated, it will cause the film rewind knob 96 to rotate. The two geared motors 7 and 8 will also be provided with appropriate sensors 73 and 83, of a known type, which can detect the rotation of these geared motors in order to allow monitoring of the rotation rates by means of an appropriate electronic circuit 90. Autonomous power supply consisting, for example, of batteries 99, preferably rechargable batteries, may also be provided.

Figure 4:
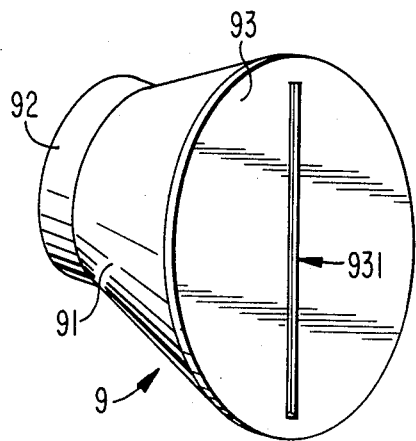
FIG. 4 shows a perspective view of the piece with a window constructed like an ordinary filter.

Finally, as shown in FIG. 3, a camera attachment piece with a window 9 will be put onto the camera lens, and will perform the same function as the plate with a vertical slit which, in other known solutions, is to be placed in the camera. This piece with a window 9 can be made up simply of an opaque screen with a slit, but in practice this solution causes diffusion of the beam of light penetrating the camera, and consequently causes slight blurring of the image obtained. To correct this problem, the piece with a window 9 was made, as shown in FIG. 4, to resemble externally an ordinary filter. In fact, as shown in FIG. 3, it is made up of a conical casing 91 provided with a ring nut 92 which allows it to be attached in a known manner to the camera lens, with the whole being identical to an ordinary filter. In this conical casing 91 are three diaphragms. A first, 93, is placed at the large end, and two diaphragms 94 and 95 at a slight distance from each other at the small end. These diaphragms 93, 94 and 95 are provided, respectively, with slits 931, 941, and 951 extending diametrically to the diaphragms and all being laid out in the same plane. This piece with a window 9 will then be put onto the lens of the camera which is attached as described to the device described in such a way that the plane passing through the slits 931, 941, and 951 will transversal to the width of the film. As shown in FIG. 3, with this application the width of the image formed on the film 98 is reduced from A-A' to B-B'. Thus we obtain the same effect which is obtained in other solutions with the plate with a slit placed in the camera in front of the film, but avoid the difficulty of application, the functional limitations, and all the resulting disadvantages which are known and have already been explained.

Figure 5:
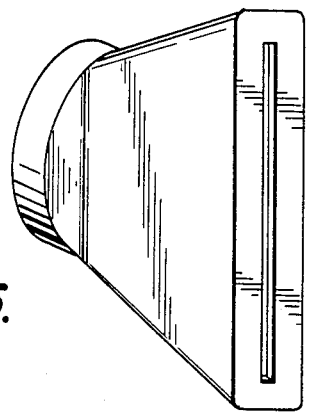
FIG. 5 shows a perspective view of another possible form of the piece shown in FIG. 4.

The piece with a window 9 may also advantageously be formed as in FIG. 5; in the tests conducted, it gave virtually the same results in this form. An examination of FIG. 3 also shows that the film 98, which is initially wound onto the spool 97, during the panoramic shot is progressively rewound onto the rewind spool 96, which is rotated as described above by the geared motor 8 by means of the connection element 44. The initial placement of the film 98, before it is wound onto the rewind spool 96 is indicated with a broken line, and the final placement after it is wound onto spool 96 is indicated with a continuous line. It is clear that the progressive accumulation of film on the rewind spool 96 will cause an increase in the rewind diameter, and because of this, if the rotation rate of the spool 96 is kept constant as, for example, in the device described in Monacan Pat. No. 1008, cited above, the advance rate of the film will increase progressively, causing substantial alteration in the size of the image obtained. In order to avoid this disadvantage, the device which is the object of this invention provides for appropriate variation in the rotation rate of the spool 96 to keep the advance rate of the film constant. This is brought about with an appropriate electronc circuit 90 which causes a predetermined and controlled reduction of the rotation rate of the geared motor 8 and therefore of the spool 96. It is important to note, for the sake of clarity, that in FIG. 3, the direction of rotation of the camera and the rewind spool 96, as well as the direction of advance of the film 98, are indicated with arrows.

Figure 6:
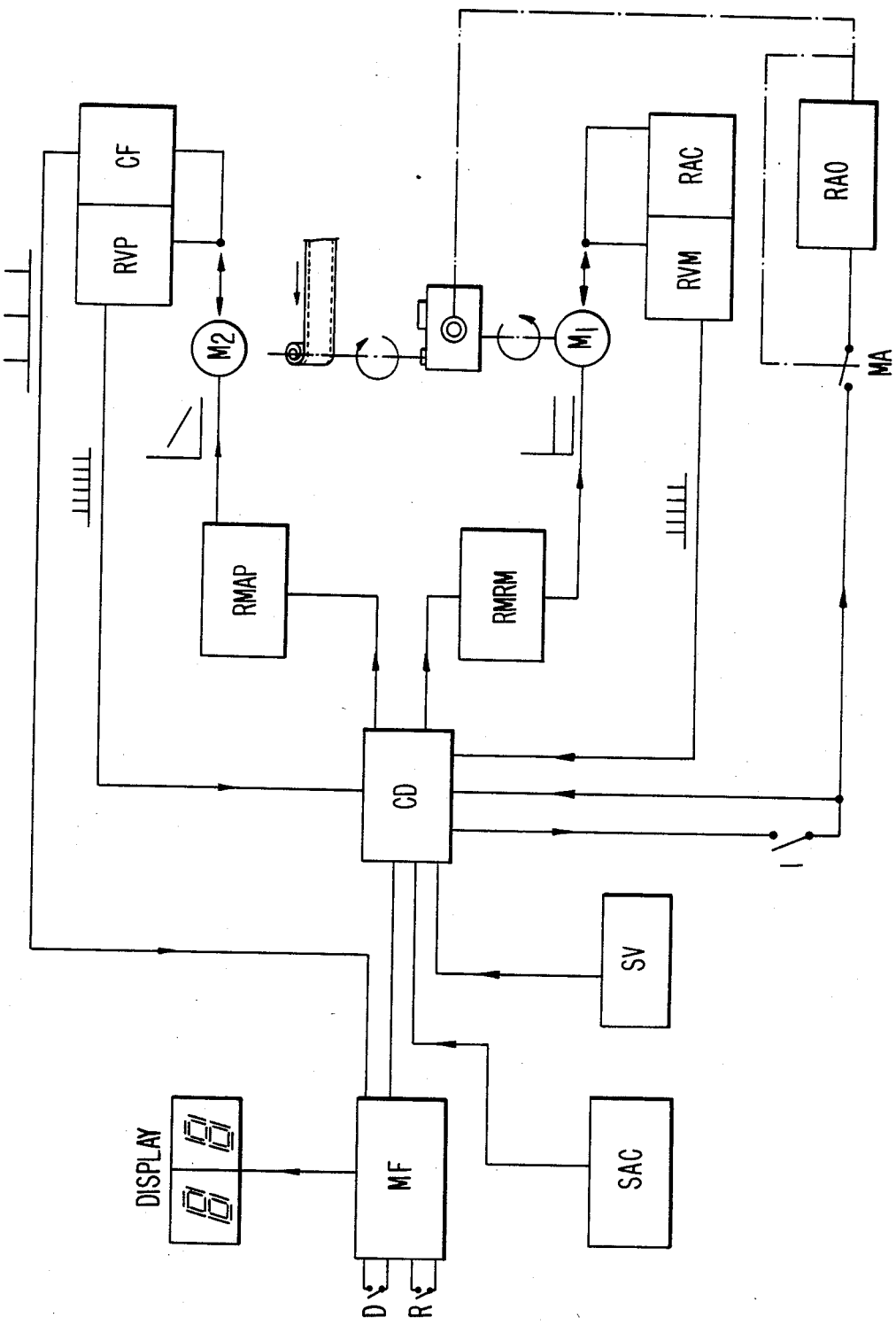
FIG. 6 is a block diagram of the electronic circuit attached to the device described.

Finally, the functioning of the device which is the object of this invention is described below with reference to the block diagram of FIG. 6, illustrating the electronic circuit 90 applied to the device itself, which is also clearly part of the invention in its entirety. This electronc circuit 90 makes it possible to obtain complete consistency in the film transfer rate as well as complete consistency in the camera rotation rate and to make the two precisely interdependent, and offers other functional advantages, as well.

The unit functions as follows: the operator places the piece with a window 9 onto the camera lens and attaches the camera as described above to the device described, which has, in turn, been previously placed on an appropriate fixed support (tripod 6). Of course, as is known and has already been mentioned, the operator will have previously provided for the transfer of the film 98 contained on the rewind spool 96 onto spool 97, and will set the shutter speed selector of the camera in "OPEN" position, normally indicated as "B". He then finds the field to be shot by defining its beginning and end. To establish the beginning of the shot, he positions the device in such a way that the camera is positioned slightly before the beginning of the field to be scanned, and he establishes the width of this field by means of the field width selector SAC which, as described below, will automatically stop the shot itself.

In relation to the focal length of the lens used, he selects the corresponding camera rotation rate and the corresponding film transfer rate by means of the rate selector SV, which controls the data comparator CD, to determine the feeds from geared motors $M_1$ and $M_2$ which correspond, respectively, to geared motors 7 and 8 of FIG. 2, and thus the respective fundamental rotation rates. The feeds determined in this way will then pass through the regulators RMRM (camera rotation motor regulator) and RMAP (film advance motor regulator). The regulator RMRM acts on the feed from the geared motor $M_1$ (7) in such a way that its rotation rate, and therefore that of the camera, is kept strictly constant, while the regulator RMAP acts on the feed from the geared motor $M_2$ (8) so that its rotation rate will be progressively reduced in direct relation to the increase in the rewind diameter of the film in order to obtain, as already mentioned, a strictly constant film advance rate. The impulses coming from the sensor 73 with which the geared motor 7 is equipped are fed into the detector RVM, which detects the camera rotation rate, and into the field width detector RAC whose function is to indicate, from one moment to the next, the angle of rotation described by the camera as soon as it begins to move. The signal issuing from the detectors RVM and RAC is sent to the data comparator CD, in which it is compared with the pre-established value in the selector SV to obtain the desired rotation rate of the geared motor $M_1$ (7) and thus the desired rotation rate of the camera, and it is also compared with the pre-established value in the field width selector SAC so that the geared motor $M_1$ (7) will be stopped automatically.

The impulses coming from the sensor 83 with which the geared motor 8 is equipped are fed into the detector RVP which detects the rotation rate of the rewind spool (96) of the film (98) and into the exposure counter CF. The signal issuing from the detector RVP is sent to the data comparator CD, where it is compared with the pre-established value in the rate selector SV to obtain the desired fundamental rotation rate of the geared motor $M_2$ (8), which will then be varied appropriately by the film advance motor regulator RMAP, and with the pre-established value in the field width selector SAC so that the geared motor $M_2$ (8) will be stopped automatically at the same time that $M_1$ (7) is stopped. The signal issuing from the exposure counter CF is sent to the exposure memory MF, and the value stored in memory is then sent to the data comparator CD, which will command the film advance motor regulator RMAP to feed the geared motor $M_2$ (8) in such a way that the rotation rate of the latter will always be a function of the rewind diameter that is attained which, in turn, is clearly dependent upon the length of film used (or equivalent number of exposures) stored in the memory of the MF.

The exposure memory MF is further connected to an appropriate display and to push-buttons D (display) and R (reset). When button D is pushed, the display will show the value stored in memory, and when button R is pushed, it will reset the memory at zero. Finally, the starting position of the device is controlled by the switch I. Closing of this switch activates the data comparator CD and consequently all the other functions of the electronic circuit as described above. Therefore, with a slight delay, the opening of the lens, which will remain open until the end of the shot, is controlled in a known manner and with known means. This delay was introduced to make it possible to avoid, at the beginning of the shot, alterations of the image caused by inertia of the unit and resumption of mechanical play. The starting position can be controlled manually or automatically, and the electronic circuit will be provided with a switch MA for this purpose. When manual control is used, the switch MA will be open, and the lens opening will be controlled by normal means and with a normal flexible shaft, whose activation will cause the switch I to close before the lens opens. In the case of automatic control, the switch MA will be closed, so that the closing of switch I also controls the lens opening delay group RAO which, in turn, will control the opening and closing of the lens by means of an appropriate electromechanical device. It is important to note that the closing of switch I can also be controlled by various known remote control systems.

On the basis of this explanation, it is clear that the device described makes it possible, in a very simple manner and with an ordinary camera, to take panoramic shots which are free from longitudinal alterations of the image, without the necessity of inserting auxiliary elements into the camera, such as the plate with a vertical window, already described. An additional advantage is that the film can be used partly for panoramic shots and partly for normal shots.

It is clearly understood that a number of variants can be introduced into the device which is the object of this invention without deviating from the spirit and scope of the invention as defined in the following claims.

I claim:

1. A device for taking panoramic photographs with an ordinary camera, comprising:
    a support means adapted to fixedly support a camera;
    a first drive mechanism attached to said support means for causing said support means to be rotated with respect to a fixed support;
    a second drive mechanism attached to said support means, said second drive means including means operatively connected to cause rotation of a rewind spindle of a camera mounted on said support means; and
    control circuit means operatively connected to said first and second drive mechanisms for monitoring and regulating individually the rates of rotation of said first and second drive mechanisms, said control circuit means causing the rate of rotation of a camera body attached to said support means to be maintained constant and causing the rate of rotation of a rewind spindle of a camera body attached to said support means to be varied as the film is wound around the rewind spindle so that the advance rate of film being exposed in the camera body is regular and uniform.

2. The device of claim 1, wherein said first drive mechanism includes a first geared motor and said second drive mechanism includes a second geared motor, the rotational speed of said first and second geared motors being individually regulated by said control circuit means.

3. The device of claim 2, wherein said first drive mechanism includes a first sensor for detecting the rotation of said first geared motor, said second drive mechanism includes a second sensor for detecting rotation of said second geared motor, said control circuit means connected to said first and second sensors for receiving signals from said first and second sensors and for monitoring and controlling the rates of rotation of said first and second geared motors.

4. The device of claim 3, wherein said control circuit means includes a rate selector (SV), said rate selector operative to set the camera rotation rate and corresponding film transfer rate in relation to the focal length of a camera lens which is used for taking a panoramic photograph; said control circuit means connected to said rate selector (SV) for controlling the camera rotation rate and the film transfer rate in relation to the focal length of a camera lens.

5. The device of claim 4, wherein said control circuit means includes a camera rotation motor regulator (RMRM) means, said camera rotation motor regulator means being operatively connected to said rate selector (SV) and said first geared motor for causing said support means to rotate at a constant rate of speed.

6. The device of claim 5, wherein said control circuit means further includes data comparator (CD) means operatively connected to a first detector (RVM), a field width detector (RAC), said camera rotation motor regulator (RMRM) means and said rate selector (SV); said first detector (RVM) being operatively connected to said first sensor for detecting the camera rotation rate; said field width detector (RAC) being operatively connected to said first sensor for indicating the angle of rotation of the camera; said data comparator (CD) means comparing signals from said first detector (RVM) and from said field width detector (RAC) to pre-set values stored in said rate selector (SV) for causing said camera rotation motor regulator (RMRM) means to stop rotation of said first geared motor when said support means has rotated the camera to a desired position.

7. The device of claim 4, wherein said control circuit means includes a film advance motor regulator (RMAP) means, said film advance motor regulator (RMAP) means being operatively connected to said rate selector (SV) and said second geared motor for causing said second geared motor to rotate a rewind spindle of a camera mounted on said support means, the rotation rate of said second geared motor being controlled by said film advance motor regulator (RMAP) means so that the rotation rate of the spindle is progressively reduced in direct relation to the increase in rewind diameter of film on the rewind spindle whereby film is advanced in the camera at a constant rate of speed.

8. The device of claim 7, wherein said control circuit means further includes data comparator (CD) means operatively connected to a second detector (RVP), said rate selector (SV), said film advance motor regulator (RMAP) means and a field width selector (SAC); said second detector (RVP) being operatively connected to said second sensor to detect the rate of rotation of a rewind spindle of a camera mounted on said support means; said field width selector (SAC) and said rate selector (SV) having pre-set values which are supplied to said data comparator means; whereby said data comparator (CD) means compares signals from said second detector (RVP) to pre-set values stored in said rate selector (SV) and in said field width selector (SAC) for causing said film advance motor regulator (RMAP) means to stop rotation of said second geared motor when said support means has rotated the camera to a desired position.

9. The device of claim 8, wherein said control circuit means further includes an exposure counter (CF) means, said exposure counter means being operatively connected to said second sensor for sending signals to an exposure memory (MF) means, said exposure memory means being operatively connected to said data comparator (CD) means for causing signals from said exposure memory (MF) means to be transmitted through said data comparator (CD) means to said film advance motor regulator (RMAP) means and thereby control the speed of said second geared motor so that rotation of the rewind spindle is a function of the diameter of film taken up on the rewind spindle which is determined by the length of film stored in the exposure memory (MF) means.

10. The device of claim 1, wherein a camera is removably attached to said means to fixedly support a camera, said camera further including a camera attachment piece, said camera attachment piece having connection means for attaching said camera attachment piece to a camera body, said camera attachment piece including a conical casing extending from said connection means, said casing provided with at least one opaque diaphragm extending across said casing, said at least one opaque diaphragm having a slit therein for reducing the width of an image formed on a portion of a strip of film held in said camera.

11. The device of claim 10, wherein said camera attachment piece includes three opaque diaphragms, said diaphragms each having a slit therein, each of said slits being aligned in a plane which is transverse to the width of film which is advanced in said camera.

12. The device of claim 1, wherein said control circuit means further includes means to open and close the lens of a camera mounted on said support means, said control circuit means operative to delay opening of a lens of a camera mounted on said support means whereby alterations of an image on film in the camera caused by initial movement of the camera can be avoided.

* * * * *